United States Patent Office 3,393,198
Patented July 16, 1968

3,393,198
HEXAHYDRO-11bH-BENZO[a]QUINOLIZINES
Richard Unger, Siegmund Sommer, Ernst Schorscher, and Helmut Müller-Calgan, Darmstadt, Germany, assignors to E. Merck A.G., Darmstadt, Germany
No Drawing. Filed July 16, 1965, Ser. No. 472,731
Claims priority, application Germany, July 25, 1964, M 61,873
3 Claims. (Cl. 260—286)

ABSTRACT OF THE DISCLOSURE

Specific 2-hydroxy-2-ethyl-1,2,3,4,6,7-hexahydro-11bH-benzo[a]quinolizines and pharmaceutically acceptable salts thereof are claimed as neuroleptics.

Unclaimed subject matter of this application is claimed in application Ser. No. 607,666, filed on Jan. 6, 1967, said application being owned by a common assignee, and invented by two of the inventors of this application.

The invention relates to hexahydro-11bH-benzo[a]-quinolizines, processes for their production, and to therapeutic compositions based thereon.

Objects of this invention, therefore, include the providing of novel hexahydro-11bH-benzo[a]quinolizines and processes for their manufacture.

Another object is to provide therapeutic compositions based on hexahydro-11bH-benzo[a]quinolizines.

A further object is to provide processes for administering hexahydro-11bH[a]quinolizines to effect therapeutic activities. A still further object is to provide novel intermediates which are produced during the process of synthesizing hexahydro-11bH-benzo[a]quinolizines.

Upon further study of the specification and claims, other objects and advantages of the present invention will become apparent.

To achieve the objects of this invention, there are provided hexahydro-11bH-benzo[a]quinolizines of the following Formula I, as well as esters, acid addition salts, and quaternary ammonium salts thereof:

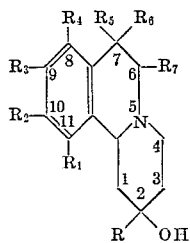

wherein

R represents alkyl, alkenyl, or alkynyl, each having 1–4 carbon atoms; phenyl; or phenylalkyl of 7–10 carbon atoms, $R_1$, $R_2$, $R_3$ and $R_4$ each represents hydrogen fluorine, chlorine, bromine, or alkyl of 1–3 carbon atoms, and $R_5$, $R_6$ and $R_7$ each represents hydrogen, alkyl of 1–4 carbon atoms, or phenyl.

The novel hexahydro-11bH-benzo[a]quinolizines possess very valuable pharmacological properties. In particular, they exhibit a depressant effect upon the central nervous system (narcosis-potentiating, sedative and/or tranquilizing and neuroleptic) in various test procedures on mammals, e.g. rats, cats, dogs, and monkeys. Some compounds also exhibit sympathicolytic and blood pressure lowering, as well as peripheral vasodilatory activity. For example, the following value with respect to efficaciousness are obtained from oral administration to rats by the hexobarbital narcosis test, meprobamate being used as the standard.

| Hexahydro - 11bH - benzo[a]-quinolizine (in each case the more soluble one of the two possible racemates): | Effect, based on meprobamate=1 |
|---|---|
| 2-hydroxy-2-ethyl-9-chloro- | 20 |
| 2-hydroxy-2-ethyl- | 10 |
| 2-hydroxy-2-methyl- | 4 |
| 2-acetoxy-2-ethyl- | 4 |
| 2-hydroxy-2-ethyl-10-methyl- | 3 |
| 2-hydroxy-2-n-propyl- | 2 |

In the hexobarbital narcosis test, groups of 10 female rats (weight 130–280 g.) receive, after 20 hours of fasting, graded guantities of the test substances (suspended in gum arabic solution) by oral administration. A group of 10 control animals simultaneously receives orally a 5% gum arabic solution. After 45 minutes, all animals receive intravenously hexobarbital sodium (20 mg./kg.). The animals are positioned on their backs on heated troughs. The duration of narcosis of the animals is determined with the aid of two criteria (head raising and turning from supine to prone position) and compared. The minimally effective dosage of the test substances is defined as the lowest dosage at which a marked difference in effectiveness occurs with respect to the control animals (statistical assurance by means of the Mann-Whitney Test).

To produce the hexahydro-11bH-benzo[a]quinolizines of Formula I, ketone of Formula II

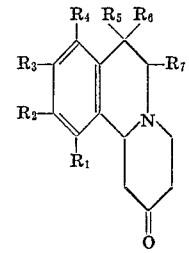

wherein $R_1$ to $R_7$ have the previously indicated meanings, is reacted in an organic solvent with an organometallic compound of Formula III $$R—M \qquad III$$

wherein

R has the previously indicated meaning,
M represents an alkali metal atom, preferably a lithium atom, or the group—MgX, and
X represents a chlorine, bromine, or iodine atom.

Aside from the preceding reaction, a compound of Formula I wherein R is an alkenyl or alkynyl group can be catalytically hydrogenated, and/or if desired the obtained compound can be converted, by treatment with acylating agents, into the physiologically compatible esters, thereof, and/or can be converted, by treatment with acids, into the physiologically compatible acid addition sals thereof or, by treatment with alkylating agents containing 1–8 carbon atoms, into the quaternary ammonium salts thereof.

The residue R has the following preferred representations: methyl, ethyl, propyl, isopropyl, n-butyl, isobutyl, sec.butyl, tert.butyl, vinyl, allyl, propenyl, isopropenyl, butenyl, ethynyl, propargyl, butynyl, phenyl, benzyl, 1- or 2-phenylethyl, and 1-, 2- or 3-phenylpropyl.

Alkyl groups representing $R_1$ to $R_7$ are preferably methyl, ethyl, propyl, or isopropyl, and additionally with respect to $R_5$ to $R_7$, n-butyl isobutyl, sec.butyl, and tert.butyl.

Ketones of Formula II are preferably those of Formula IV:

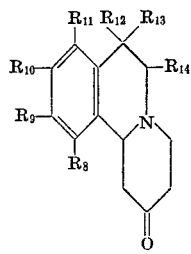

wherein
$R_8$ is H or $CH_3$,
$R_9$ is H, $CH_3$, F or Cl,
$R_{10}$ is H, $CH_3$, F or Cl,
$R_{11}$ is H or $CH_3$,
$R_{12}$ is H, $CH_3$, $C_2H_5$ or $C_6H_5$,
$R_{13}$ is H, $CH_3$ or $C_2H_5$, and
$R_{14}$ is H, $CH_3$ or $C_2H_5$.

Particularly preferred ketones of Formula II are the unsubsitiuted 2 - oxo - 1,2,3,4,6,7-hexahydro-11bH-benzo[a]-quinolizine, as well as the following substitution products thereof: 6-methyl-, 7,7-diethyl-, 7,7-dimethyl-, 7-phenyl-, 8-methyl-, 9-methyl-, 9-fluoro-, 9-chloro-, 10-methyl-, 10-fluoro-, 10-chloro-, 8,10-dimethyl-, 9,10-dimethyl-, 11-methyl-, 8,11-dimethyl-, and 10,11-dimethyl-1,2,3,4,6,7-hexahydro-11bH-benzo[a]-quinolizine.

The ketones of Formula II can be produced by conventional techniques, for example, by methods disclosed in "Chemische Berichte" (Chemical Reports), vol. 95, p. 2132 (1962).

The 3,4-dihydro-isoquinolines required for the synthesis of the ketones II are accessible, for example, by the well-known Bischler-Napieralski reaction as, for instance, reviewed in Organic Reactions, volume 6 (John Wiley & Sons, New York, 1951), pages 74 to 150.

A suitable organometallic compound of Formula III is preferably an organolithium compound or a Grignard compound of the formula R—MgX.

The reaction of the ketones of Formula II with the organometallic compound of Formula III is conducted preferably in solvents, such as diethyl ether, diisopropyl ether, tetrahydrofuran, anisole, benzene, toluene, xylene, or other hydrocarbons, or also in mixtures of these solvents. The main criterion for the solvent is that it does not deleteriously interfere with the reaction. It is possible either to add the ketone of Formula II, or a solution of this ketone, to a solution of the organometallic compound, or conversely to add a solution of the organometallic compound to a solution of the ketone.

The reaction temperature is not critical and can range between approximately —10° C. and the boiling temperature of the solvent used. Preferably, the mixture is cooled at the beginning of the reaction, the reaction being initiated in certain cases by the admixture of a small quantity of iodine. In order to terminate the reaction, the mixture is normally stirred for a period of time at the end of the reaction, is left standing, or is heated for a short period of time.

The working-up process is conducted by the addition of water, salt solutions (for example ammonium chloride solution), or acids, and extraction with organic solvents.

In a few cases, particularly when utilizing unsaturated organometallic compounds, only one single reaction product is produced along with negligible to nil amounts of other products. In other cases, however, two diastereomeric racemates are obtained which can be separated, if desired, by fractional crystallization and/or chromatography methods. If desired, it is also possible to separate, in a conventional manner, a racemate into optically active antipodes; this can be done, for example, by fractionally crystallizing a salt of the racemate in an optically active acid. Optically active acids are, for example, dibenzoyl-D-tartaric acid, D-camphor-sulfonic acid, or D-tartaric acid. Optically active final products can also be obtained by using an optically active ketone II as the starting material.

Such compounds of Formula I wherein the residue R represents an alkenyl or alkynyl group can be hydrogenated to form the corresponding alkyl compounds. This hydrogenation is conducted catalytically in a conventional manner, preferred catalysts being noble metal catalysts. The latter can be employed as supported catalysts, such as, for example, palladium on charcoal, calcium carbonate, or strontium carbonate; as oxide catalysts, such as, for platinum oxide; or as finely divided metal catalyst. The hydrogenation can be conducted at room temperature and normal pressure, or at elevated temperature and/or increased pressure. Preferably, absolute pressures between 1 and 100 atmospheres and temperatures between room temperature and +150° C. are employed. Solvents for the hydrogenation process are particularly methanol, ethanol, isopropanol, tert.butanol, ethyl acetate, dioxane, glacial acetic acid and tetrahydrofuran. In some cases, it is advantageous to add catalytic or equimolar amounts of a mineral acid, for example hydrochloric or sulfuric acid. In place of the free base, it is also possible to use a salt of the base. During the hydrogenation step, care must be taken that the aromatic ring is not likewise attacked. Therefore, it is preferred to conduct the reaction at normal pressure in such a manner that the hydrogenation is stopped after the stoichiometric amount of hydrogen has been absorbed.

A compound of Formula I obtained according to the process of this invention can be converted into its physiologically compatible esters by treatment with acylating agents. Acylating agents which can be used are all those acids or their derivatives suitable for esterification, which result in the physiologically compatible esters. For example, the following acids or the derivatives thereof suitable for esterification can be employed: carboxylic acids, such as acetic acid, propionic acid, butyric acid, valeric acid, isovaleric acid, trimethyl acetic acid, caproic acid, enanthic acid, caprylic acid, palmitic acid, undecylenic acid, benzoic acid, hexahydrobenzoic acid, cyclopentyl-, cyclohexyl-, or arylacetic- and -propionic acids, such as phenylacetic or phenylpropionic acid, as well as halogenocarboxylic acids, such as chloro-acetic acid, ether acids or heterocyclic acids, such as furancarboxylic acid-(2) or nicotinic acid. If desired, the esterification can also be conducted by means of dicarboxylic acids, amino- or alkylamino carboxylic acids, or phosphoric or sulfuric acid, in order to produce water-soluble derivatives. In this manner, there can be produced, for example: oxalates, succinates, maleates, or the acid addition salts of amino carboxylic acid esters, such as, for example, aspartic acid or diethylamino acetic acid ester. Derivatives suitable for esterification are, in addition to the free acids, for example the halogenides, anhydrides, thiol derivatives, as well as ketenes thereof. For transesterification processes, lower alkyl esters are likewise suitable.

A compound of Formula I obtained according to the process of this invention can furthermore be converted in a conventional manner into the acid addition salt thereof. For this reaction, such acids can be used which yield physiologically safe salts. Thus, it is possible to employ organic and inorganic acids, such as, for example, aliphatic, alicyclic, araliphatic, aromatic, or heterocyclic, mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, isonicotinic acid, methanesulfonic acid, ethanedisulfonic acid, β-hydroxyethanesulfonic acid, p-toluenesulfonic acid, naphthalenemono- and -disulfonic acids, sulfuric acid, nitric acid, hydrohalic acids, such as hydrochloric acid or hydrobromic acid, or phosphoric acids, such as orthophosphoric acid, etc.

By treatment with alkylating agents of up to 8 carbon atoms, preferably methyl iodide, dimethyl sulfate, or ethane halogenides, the compounds of Formula I can be converted into the physiologically compatible quaternary ammonium compounds thereof.

According to the invention, compounds of the following formulas are preferred:

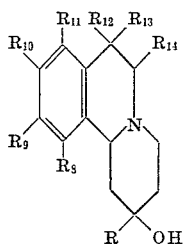

V wherein R and $R_8$ to $R_{14}$ have the previously indicated meanings;

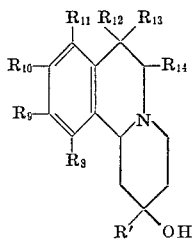

VI wherein

R' represents an alkyl or alkenyl group of 1–4 carbon atoms, ethynyl, or phenyl, and
$R_8$ to $R_{14}$ have the previously indicated meanings;

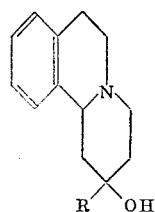

VII wherein R has the previously indicated meaning;

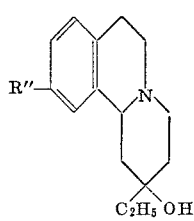

VIII wherein R'' represents H or $CH_3$.

Also preferred are the esters of the compounds of Formulas V to VIII, preferably the lower fatty acid esters, particularly the acetates. A still further preferred subgeneric group are the acid addition and quaternary ammonium salts of the compounds of Formulae V to VIII, as well as their esters.

Finally, the most preferred compounds of this invention are the following 2-hydroxy-1,2,3,4,6,7-hexahydro-11bH-benzo[a]quinolizines:

2-methyl-,
2-ethyl-,
2-n-propyl-,
2-isopropyl-,
2-n-butyl-,
2-isobutyl-,
2-vinyl-,
2-allyl-,
2-propenyl-,
2-ethynyl-,
2-propargyl-,
2-phenyl-,
2-benzyl-,
2-(1-phenylethyl)-,
2-(2-phenylethyl)-,
2-(3-phenyl-propyl-1)-,
2-ethyl-6-methyl-,
2-ethyl-7,7-dimethyl-,
2-ethyl-7-phenyl-,
2-ethyl-8-methyl-,
2-ethyl-9-methyl-,
2-ethyl-9-fluoro-,
2-ethyl-9-chloro-,
2-ethyl-10-fluoro-,
2-ethyl-8,10-dimethyl-,
2-ethyl-11-methyl-,
2-ethyl-10,11-dimethyl-,
2,7,7-triethyl-,
2,7,7-trimethyl-,
2,8-dimethyl-,
2-methyl-9-fluoro-,
2,10-dimethyl-,
2-methyl-10-chloro-,
2,9,10-trimethyl-,
2,8,11-trimethyl-,
2-methyl-6-ethyl-,
2-propyl-6-methyl-,
2-propyl-7,7-dimethyl-,
2-propyl-7-phenyl-,
2-propyl-9-methyl-,
2-propyl-9-chloro-,
2-propyl-10-fluoro-,
2-propyl-8,10-dimethyl-,
2-propyl-11-methyl-,
2-ethyl-10-methyl-,
2-ethyl-10-chloro-,
2-ethyl-9,10-dimethyl-,
2-ethyl-8,11-dimethyl-,
2,6-diethyl-,
2,6-dimethyl-,
2-methyl-7-phenyl-,
2,9-dimethyl-,
2-methyl-9-chloro-,
2-methyl-10-fluoro-,
2,8,10-trimethyl-,
2,11-dimethyl-,
2,10,11-trimethyl-,
2-methyl-7,7-diethyl-,
2-propyl-6-ethyl-,
2-propyl-7,7-diethyl-,
2-propyl-8-methyl-,
2-propyl-9-fluoro-,
2-propyl-10-methyl-,
2-propyl-10-chloro-,
2-propyl-9,10-dimethyl-,
2-propyl-8,11-dimethyl-, 2-propyl - 10,11-dimethyl-1,2,3,4,6,7-hexahydro - 11bH-benzo[a]quinolizine, as well as the esters of the above-mentioned compounds, particularly the corresponding 2-acetoxy-and 2-propionyloxy compounds, such as:

2-acetoxy-2-methyl-,
2-acetoxy-2-ethyl-,
2-acetoxy-2-propyl-,
2-acetoxy-2-ethyl-10-methyl-,
2-propionyloxy-2-methyl-,
2-propionyloxy-2-ethyl-,
2-propionyloxy-2-propyl-,
2-propionyloxy-2-ethyl-10-methyl-1,2,3,4,6,7-hexahydro-11bH-benzo[a]quinolizine.

The novel compounds can be employed in admixture with conventional pharmaceutical excipients, a unit dosage form containing preferably 1—100 mg. Carrier substances can be such organic or inorganic substances which are suitable for parenteral, enteral, or topical application and which do not react with the novel compounds, such as, for example, water, vegetable oils, polyethylene glycols, gelatin, lactic sugar, amylose, magnesium stearate, talc, vaseline, cholesterol, etc. Particularly suitable for parenteral application are solutions, preferably oily or aqueous solutions, as well as suspensions, emulsions, or implants. For enteral application, tablets or dragees are preferred forms, and for topical application salves or creams which are, if desired, sterilized or mixed with auxiliary substances, such as preservatives, stabilizers or wetting agents, or salts for influencing the osmotic pressure, or buffering agents.

The compounds of this invention can thus be administered in effective dosages by any usual technique, e.g., parenteral, enteral or topical, and in a preferred dosage of 1 to 100 mg.

As mentioned above, some of the novel compounds show pharmacological utilities in addition to a depressant effect upon the central nervous system. The higher melting form of 2 - hydroxy-2-ethyl-10-methyl - 1,2,3,4,6,7-hexahydro-11bH-benzo[a]quinolizine is to be taken as an example. A dose of 0.005 mg./kg. of the hydrobromide (m.p. 205°) of this compound given intravenously to anesthetized dogs caused an increase of the blood volume in the periphery (areteria femoralis, arteria vertebralis); higher doses increase the intensity and duration of this effect. The blood pressure is not lowered until doses of 1 mg./kg. and higher are given. Doses of 0.02 to 0.5 mg./kg. injected intravenously to waking dogs increased the muscular blood supply, influencing simultaneously neither the blood supply of the skin nor the blood pressure.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

Under a dry nitrogen atmosphere, there is prepared from 14.3 g. methyl bromide and 2.1 g. lithium in 200 ml. absolute ether a solution of methyl lithium. Under stirring at —10° C. a solution of 20.1 g. 2-oxo-1,2,3,4,6,7-hexahydro-11bH-benzo[a]quinolizine in 100 ml. absolute tetrahydrofuran is added, and the stirring is continued for about 15 hours at room temperature. Thereafter, the mixture is made acidic with dilute hydrochloric acid, the ether-tetrahydrofuran mixture is separated, and the aqueous phase is made alkaline with sodium hydroxide solution and extracted with ether. The ether extract is dried over magnesium sulfate and concentrated by evaporation. The residue—18.9 g. oily 2-hydroxy-2-methyl-1,2,3,4,6,7-hexahydro-11bH-benzo[a]quinolizine—is dissolved in 100 ml. boiling cyclohexane.

The resultant cyclohexane solution is then allowed to remain one day at room temperature to precipitate out 10.4 g. of the less readily soluble racemate; M.P. 134° C. The mother liquor is concentrated by evaporation, and the residue is chromatographed on silica gel. First, the more readily soluble racemate, M.P. 104° C., is eluted with a mixture of benzene and triethyl amine (8:2). This racemate is converted, with hydrobromic acid in ether, into the hydrobromide, M.P. 186–187° C. (from ethanol/ether); yield: 7 g. By washing out the silica gel column with methanol, there is obtained a further 1.4 g. of the racemate, having a melting point of 134° C., of which the hydrobromide melts at 205–206° C. (from ethanol/ether).

Example 2

(a) From 2.1 g. lithium and 16.4 g. ethyl bromide in 100 ml. absolute ether and under a nitrogen atmosphere, there is prepared an ethyl lithium solution. Under stirring, there is gradually added a solution of 20.1 g. 2-oxo-1,2,3,4,6,7-hexahydro-11bH-benzo[a]quinolizine in 150 ml. absolute ether. Subsequently, the mixture is stirred for 30 minutes at room temperature and then boiled for 2 hours under reflux. Water is added, the mixture is acidified with hydrochloric acid, and then the ether is separated and shaken out twice with dilute hydrochloric acid.

The combined hydrochloric extracts are purified with active charcoal, made alkaline with sodium hydroxide solution, and shaken out with ether. The ether extract is dried over magnesium sulfate and concentrated by evaporation.

The remaining racemate mixture of 2-ethyl-2-hydroxy-1,2,3,4,6,7-hexahydro-11bH-benzo[a]quinolizine is dissolved in 300 ml. acetone and acidified with ethanolic hydrochloric acid. After the mixture has been allowed to stand for 1 to 2 days, 7.3 g. hydrochloride of the less readily soluble racemate, M.P. 224° C., crystallize. The mother liquor is concentrated by evaporation; the residue is taken up in ether and dilute solution of sodium hydroxide. The ether solution is dried for a short time over magnesium sulfate and thereafter acidified with ethereal hydrobromic acid. The ether is removed by decanting, the precipitate is triturated with 200 ml. acetone, vacuum filtered, and recrystallized from isopropanol. There are obtained 7.2 g. of the hydrobromide of the more readily soluble racemate, M.P. 202 C.

(b) 4.5 g. of racemate having the melting point of 202° C. are heated with 50 ml. acetic anhydride and 5 ml. pyridine under a nitrogen atmosphere for 4 hours to 100° C. Subsequently, the mixture is poured into 500 ml. ice water, made alkaline with sodium carbonate, and shaken out with ether. From the ether extract dried with magnesium sulfate, there is obtained 2-acetoxy-2-ethyl-1,2,3,4,6,7-hexahydro-11bH-benzo[a]quinolizine, B.P. 119–121° C./0.01 mm. Picrolonate, M.P. 236° C. (decomposition).

The obtained acetate can be converted into the hydrochloride thereof with hydrogen chloride in methanol/ether.

Analogously, there is obtained with propionic acid anhydride 2-propionyloxy-2-ethyl-1,2,3,4,6,7 - hexahydro-11bH-benzo[a]quinolizine, B.P. 127–130° C./0.01 mm., and with butyric acid anhydride 2-butyryloxy-2-ethyl-1,2,3,4,6,7-hexahydro-11bH - benzo[a]quinolizine, B.P. 134–136° C./0.01 mm.

Example 3

A propyl lithium solution prepared from 2.1 g. lithium and 18.5 g. propyl bromide in 200 ml. absolute ether, under a nitrogen atmosphere, is mixed under ice cooling during the course of one hour with a solution of 20.1 g. 2-oxo-1,2,3,4,6,7-hexahydro-11bH - benzo[a]quinolizine in 150 ml. absolute ether. Subsequently, the mixture is stirred overnight at room temperature. Then, the reaction mixture is decomposed with ice water. The ether is separated, the aqueous phase is again shaken out with ether, and the combined ether extracts are dried with magnesium sulfate. After the ether has been removed by evaporation, the oily 2-hydroxy-2-propyl-1,2,3,4,6,7-hexahydro-11bH-benzo[a]quinolizine is chromatographed on silica gel; the solvent is benzene/triethylamine (8:2). The last residue of the poorly soluble isomer is washed out with methanol. The more readily soluble isomer is converted into the hydrochloride (M.P. 179–180° C., from ethanol/ether; yield: 6.1 g.). From the less readily soluble isomer, there are obtained 8.1 g. hydrobromide (M.P. 159–160° C., from isopropanol).

Example 4

In an ice bath, and under an N₂ atmosphere, 48 g. of a 20% butyl lithium solution in hexane is mixed with a solution of 20.1 g. 2-oxo-1,2,3,4,6,7-hexahydro - 11bH-benzo[a]quinolizine in 500 ml. of absolute ether. The mixture is stirred for 5 hours at room temperature, and boiled for 2 hours under reflux.

The resultant reaction mixture is treated with water and the aqueous phase is twice shaken out with ether. The combined organic extracts are dried with magnesium sulfate and concentrated by evaporation. The oily racemate mixture of 2-butyl-2-hydroxyl - 1,2,3,4,6,7 - hexahydro-11bH-benzo[a]quinolizine is chromatographed on silica gel with a mixture of benzene and triethylamine (8:2). The oily, more easily soluble racemate boils at 154° C./0.1 mm.; M.P. 74° C.; yield: 7.3 g.

The less readily soluble isomer is precipitated as the hydrobromide and recrystallized from ethanol/ether. The yield is 10 g., M.P. 200° C.

Example 5

To a phenyl lithium solution, prepared from 2.1 g. lithium and 23.5 g. bromobenzene in 200 ml. absolute ether under a nitrogen atmosphere, there is added dropwise during the course of one hour and under stirring at room temperature a solution of 20.1 g. 2-oxo-1,2,3,4,6,7-hexahydro-11bH-benzo[a] quinolizine in 100 ml. absolute tetrahydrofuran. After standing overnight, a working-up operation as in Example 1 is conducted. The two isomeric racemates of 2-hydroxy-2-phenyl-1,2,3,4,6,7 - hexahydro-11bH-benzo[a]quinolizine are converted into the hydrobromides, of which the hydrobromide formed from the more readily soluble racemate melts at 224° C. after recrystallization from ethanol/ether (yield: 3.9 g.). The hydrobromide of the less readily soluble racemate is recrystallized from isopropanol, M.P. 204° C., yield: 14.4 g.

Example 6

(a) A solution of 20.1 g. 2-oxo-1,2,3,4,6,7-hexahydro-11bH-benzo[a]quinolizine in 100 ml. absolute tetrahydrofuran is added to a solution of ethynyl magnesium bromide in tetrahydrofuran under stirring during the course of about 30 minutes. After allowing the mixture to stand for two days at room temperature, a working-up operation as in Example 1 is conducted. The residue contains, for practical purposes, only one of the two possible racemates. The latter is precipitated as the hydrobromide and recrystallized from isopropanol. There are obtained 13.2 g. 2-ethynyl-2-hydroxy-1,2,3,4,6,7-hexahydro-11bH - benzo[a]quinolizine-hydrobromide, M.P. 227° C.

(b) 3 g. of the hydrobromide are hydrogenated in 100 ml. methanol in the presence of palladium charcoal. After absorption of the stoichiometric quantity of hydrogen, the hydrogenation is terminated, and there are obtained after distilling off the methanol and recrystallization from isopropanol 2.7 g. 2-ethyl-2-hydroxy-1,2,3,4,6,7-hexahydro-11bH - benzo[a]quinolizine - hydrobromide, M.P. 206–207° C.

EXAMPLE 7

Under cooling to −40° C., acetylene is fed into a solution of 15.3 g. lithium in 500 ml. liquid ammonia until the deep blue solution is decolorized. Without discontinuing the cooling, there are now added under stirring 224 g. 10-methyl-2-oxo-1,2,3,4,6,7-hexahydro-11bH-benzo[a]quinolizine, dissolved in 800 ml. absolute tetrahydrofuran. Thereafter, the stirring is continued for 5 hours at −40° C., and then the cooling is stopped so that the ammonia evaporates; water is then added gently.

The resultant tetrahydrofuran solution is separated and after drying over magnesium sulfate, is evaporated to concentrate the solution. The obtained raw 2-ethynyl-2-hydroxy - 10-methyl-1,2,3,4,6,7-hexahydro-11bH-benzo[a]-quinolizine is dissolved in 2.5 liters of methanol and, after adding 50 g. palladium charcoal, is hydrogenated at normal pressure and room temperature until the reaction is terminated. After the catalyst is removed by vacuum filtration, the methanol is distilled off and there is obtained the practically pure, less soluble racemate of 2-ethyl-2-hydroxy - 10-methyl-1,2,3,4,6,7-hexahydro-11bH-benzo[a]-quinolizine, M.P. 136° C. The base is precipitated from an ethereal solution as the hydrobromide. After recrystallization from ethanol, the hydrobromide, being uniform as per thin-layer chromatographical analysis, melts at 205° C. The yield amounts to 210 g.

Preparation of the starting compound:

332 g. 7-methyl-3,4-dihydroisoquinoline-hydrochloride having a melting point of 178–179° C. are added batchwise under stirring to 335 g. methylvinyl ketone heated on a steam bath. After the entire quantity has been added, the mixture is additionally stirred on a steam bath for one hour. The mixture is cooled, mixed with 700 ml. acetone, and the hydrochloride of 10 - methyl - 2 - oxo-1,2,3,4,6,7 - hexahydro-11bH-benzo[a]quinolizine is vacuum filtered, M.P. 202° C.

The hydrochloride is converted into the free base (M.P. 95–97° C.) with sodium hydroxide solution.

Example 8

At room temperature, there is slowly added under stirring a solution of 43 g. 10-methyl-2-oxo-1,2,3,4,6,7-hexahydro-11bH-benzo[a]quinolizine in 200 ml. absolute tetrahydrofuran to a solution of ethynyl magnesium bromide in ether. The mixture is stirred for 3 hours, at room temperature, and for 1 hour at 40° C. and subsequently the resultant magnesium complex is decomposed by gently adding dilute hydrochloric acid. The hydrochloric aqueous solution is washed with ether, made alkaline by the addition of ammonia, and extracted with ether. The residue remaining after drying and evaporating the ether extract is hydrogenated as in Example 7. There are obtained 39.5 g. 2 - ethyl - 2-hydroxy-10-methyl-1,2,3,4,6,7-hexahydro-11bH - benzo[a]quinolizine-hydrobromide as a uniform racemate, M.P. 205° C.

Example 9

Analogously to Example 2, there are obtained from 10 - methyl-2-oxo-1,2,3,4,6,7-hexahydro-11bH-benzo[a]-quinolizine and ethyl lithium the two racemates of 2-ethyl - 2-hydroxy-10-methyl-1,2,3,4,6,7-hexahydro-11bH-benzo[a]quinolizine, M.P. 136° C. (hydrobromide, M.P. 205°, from ethanol), B.P. 145–147° C./0.05 mm. (hydrobromide, M.P. 173–174° C.).

Example 10

20.1 g. 2 - oxo-1,2,3,4,6,7-hexahydro-11bH-benzo-[a]-quinolizine are boiled for 5 hours under stirring in absolute ether with a Grignard solution prepared from 4.2 g. magnesium and 25 g. benzyl chloride. Subsequently, the mixture is mixed with dilute hydrochloric acid, made alkaline with ammonia, and shaken out with ether. The base obtained from the ether extract is chromatographed on aluminum oxide with benzene/triethylamine (9:1). Both of the thus-obtained racemic bases boil at 189° C./0.01 mm. From the more easily elutable base, there are obtained 9.7 g. of a hydrobromide having a melting point of 197° C., and from the less readily elutable base, there are obtained 10.8 g. of a hydrobromide having a melting point of 204° C.

Example 11

To an ethyl lithium solution in absolute ether, prepared from 4.43 g. lithium and 38.3 g. ethyl bromide, there are added 42 g. 9 - chloro-2-oxo-1,2,3,4,6,7-hexahydro-11bH-benzo[a]quinolizine, dissolved in a mixture of absolute ether and tetrahydrofuran. After boiling for 3 hours under a nitrogen atmosphere, the resultant lithium complex is decomposed with water, the organic phase is isolated, dried, and concentrated by evaporation. The crude base is chromatographed on silica gel with benzene/triethylamine (9:1). From the more readily soluble racemate of 9 - chloro-2-ethyl-2-hydroxy-1,2,3,4,6,7-hexahydro-11bH-benzo[a]quinolizine there are obtained 12.7 g. of a hydrobromide melting at 210° C., and from the less readily soluble racemate there are obtained 15.1 g. of a hydrobromide melting at 220° C.

Preparation of the starting compound:

3-chloro-N-formyl-β-phenylethylamine, obtained by reducing 3-chloro-benzyl cyanide with lithium aluminum hydride/aluminum chloride and susequent formylation, is cyclized by heating with polyphosphoric acid to form 6-chloro-3,4-dihydro-isoquinoline. A small quantity of the by-product formed, 8-chloro-3,4-dihydro-isoquinoline, can be removed by recrystallizing the hydrochlorides from ethanol. The 6 - chloro-3,4-dihydro-isoquinoline-hydrochloride (M.P. 222° C.) is condensed, as described in Example 7, with methylvinyl ketone, thereby obtaining 9 - chloro - 2-oxo-1,2,3,4,6,7-hexahydro-11bH-benzo[a]-quinolizine-hydrochloride, M.P. 210° C.

Example 12

Analogously to Example 11, 66.5 g. 9-methyl-2-oxo-1,2,3,4,6,7 - hexahydro-11bH-benzo[a]quinolizine are reacted with ethyl lithium (from 5.8 g. lithium and 51.3 g. ethyl bromide). The thus-obtained racemate mixture of 2-ethyl - 2 - hydroxy-9-methyl-1,2,3,4,6,7-hexahydro-11bH-benzo[a]quinolizine is chromatographed as in Example 11, and the more readily soluble base is converted into the hydrobromide (M.P. 177° C.), the less readily soluble base into the hydrochloride (M.P. 230° C.).

Preparation of the starting compound:

6-methyl-3,4-dihydro-isoquinoline-hydrochloride (M.P. 198° C., obtained from N-formyl-3-methyl-β-phenylethyl-amine and polyphosphoric acid) is condensed with methylvinyl ketone to 9-methyl-2-oxo-1,2,3,4,6,7-hexahydro-11bH-benzo[a]quinolizine-hydrochloride (M.P. 173° C.), and the latter is converted into the free base (B.P. 135–138° C./0.05 mm).

Example 13

Analogously to Example 11, 11 g. 2-oxo-7-phenyl-1,2,3,4,6,7-hexahydro-11bH-benzo[a]quinolizine are reacted with the corresponding quantity of ethyl lithium. Chromatography on silica gel with benzene/triethylamine (9:1) and then chloroform/triethylamine (9:1) leads to two of the theoretically possible racemates. The more readily soluble racemate (4.8 g.) boils at 180–182° C./0.03 mm. (hydrobromide, M.P. 216° C.); the less readily soluble racemate (4.9 g.) yields a hydrobromide having a melting point of 248° C.

Preparation of the starting compound:

By heating N-formyl-β,β-diphenylethylamine with polyphosphoric acid, there is obtained 4-phenyl-3,4-dihydro-isoquinoline (B.P. 133–134° C./0.3 mm.), the hydrochloride of which (M.P. 175° C.) is reacted with methyl-vinyl ketone to form 2-oxo-7-phenyl-1,2,3,4,6,7-hexahydro-11bH-benzo[a]-quinolizine (M.P. 138–139° C.; hydrobromide, M.P. 185° C.).

Example 14

Analogously to Example 11, 10-ethyl-2-oxo-1,2,3,4,6,7-hexahydro-11bH-benzo[a]quinolizine is reacted with ethyl lithium to form 2,10-diethyl-2-hydroxy-1,2,3,4,6,7-hexahydro-11bH-benzo[a]quinolizine.

More readily soluble racemate, hydrobromide, M.P. 238° C.; less readily soluble racemate, B.P. 168° C./0.05 mm.

Preparation of the starting compound:

By heating N - formyl - β - (4-ethylphenyl)-ethylamine with polyphosphoric acid, there is obtained 7-ethyl-3,4-dihydro-isoquinoline, the hydrobromide of which (M.P. 166° C.) is reacted with methylvinyl ketone according to Example 7 forming 10-ethyl-2-oxo-1,2,3,4,6,7-hexahydro-11bH-benzo[a]quinolizine (B.P. 155–156° C./0.05 mm.).

Example 15

Analogously to Example 14, there is obtained from 10-n-propyl-2-oxo-1,2,3,4,6,7-hexahydro - 11bH-benzo[a]quinolizine (B.P. 165° C./0.03 mm.) 2-ethyl-2-hydroxy-10 - n - propyl - 1,2,3,4,6,7 - hexahydro - 11bH - benzo[a]quinolizine.

More readily soluble racemate, B.P. 175° C./0.05 mm.; less readily soluble racemate, hydrobromide, M.P. 202° C.

Preparation of the starting compound:

Heating N-formyl - 3 - (4-n-propylphenyl)-ethylamine with polyphosphoric acid results in 7-n-propyl-3,4-dihydro-isoquinoline (hydrobromide, M.P. 156° C.), which is further condensed with methylvinyl ketone.

Example 16

42.4 ml. of a 2.5 molar vinyl lithium solution in tetrahydrofuran are mixed under stirring at room temperature under a dry nitrogen atmosphere, with a solution of 10 g. 2-oxo - 1,2,3,4,6,7 - hexahydro-11bH-benzo[a]quinolizine in 100 ml. absolute tetrahydrofuran. The stirring is continued for two hours at room temperature, and then the mixture is boiled for two hours under reflux. After the conventional working-up procedure, there are obtained 10 g. oily 2-hydroxy-2-vinyl-1,2,3,4,6,7-hexahydro-11bH-benzo[a]quinolizine which is separated on silica gel with benzene/diethylamine (9:1) into a more readily soluble racemate (M.P. 111–112° C.; 1.5 g. hydrochloride, M.P. 195° C.) and a less readily soluble racemate (M.P. 107–108° C.; 5.3 g.; hydrobromide M. P. 195° C.).

By catalytic hydrogenation of the two racemates in methanol with palladium charcoal, there are obtained the two corresponding 2-ethyl compounds (cf. Example 2).

According to the same method, there are obtained from 10 g. 10-methyl-2-oxo-1,2,3,4,6,7-hexahydro-11bH-benzo[a]quinolizine the two racemates of 2-hydroxy-2-vinyl-10-methyl - 1,2,3,4,6,7 - hexahydro-11bH-benzo[a] quinolizine, namely 0.6 g. oily, more readily soluble racemate and 5.4 g. less readily soluble racemate, M.P. 113–114° C. (hydrobromide, M.P. 210° C.). By catalytic hydrogenation, the two corresponding 2-ethyl compounds are obtained (cf. Example 7).

Example 17

A solution of 7.4 g. potassium in 185 ml. tert.butanol is mixed at room temperature with a solution of 5.3 g. 2-oxo-10-methyl-1,2,3,4,6,7-hexahydro - 11bH - benzo[a]quinolizine and 185 ml. tert.butanol. Then, a stream of pure nitrogen is first conducted through the mixture for 15 minutes, and then a gentle stream of acetylene. After about 4 hours, the tert.butanol is removed by distillation; the oily residue is taken up in water, and is shaken out several times with ether. The combined ether extracts are dried over magnesium sulfate and concentrated by evaporation. The obtained 2-hydroxy-2-ethyl-10-methyl-1,2,3,4,6,7-hexahydro-11bH-benzo[a]quinolizine distills at 145° C./0.05 mm.; hydrobromide, M.P. 253° C.; yield: 4.5 g. Only one of the possible racemates is obtained.

Example 18

Analogously to Example 11, there is obtained from 2 - oxo -7,7 - dimethyl-1,2,3,4,6,7-hexahydro-11bH-benzo[a]quinolizine and ethyl lithium, the compound 2-ethyl-2-hydroxy - 7,7 - dimethyl - 1,2,3,4,6,7 - hexahydro - 11bH-benzo[a]quinolizine. Both racemates boil at 160° C./0.01 mm.

Preparation of the starting compound:

Formylation of 2-methyl-2-phenylpropylamine and subsequent cyclization with polyphosphoric acid leads to 4,4-dimethyl-3,4-dihydro-isoquinoline (B.P. 82° C./0.01 mm.), the hydrochloride of which is condensed with methylvinyl ketone.

Example 19

Analogously to Example 10, there is obtained from 2 - oxo - 8 - methyl - 1,2,3,4,6,7 - hexahydro - 11bH-benzo[a]quinolizine and allyl magnesium chloride the compound 2-allyl-2-hydroxy-8-methyl - 1,2,3,4,6,7 - hexahydro-11bH-benzo[a]qinolizine. Both racemates boil at 156–159° C./0.03 mm.

The starting compound is obtained by reacting 5-methyl-3,4-dihydro-isoquinoline-hydrochloride with methylvinyl ketone.

Analogously, there is obtained from 2-oxo-1,2,3,4,6,7-hexahydro-11bH-benzo[a]quinolizine and buten-(2)-yl-(1)-magnesium chloride: 2-[buten-(2)-yl-(1)]-2-hydroxy-1,2,3,4,6,7-hexahydro-11bH-benzo[a]quinolizine.

The preceding examples can be repeated with similar success by substituting the generically specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A member selected from the group consisting of 2 - hydroxy - 2 - ethyl - 1,2,3,4,6,7 - hexahydro - 11bH-benzo[a]qinolizine and pharmaceutically acceptable acid addition salts thereof.

2. A member selected from the group consisting of 2 - hydroxy - 2 - ethyl - 10 - methyl - 1,2,3,4,6,7 - hexahydro-11bH-benzo[a]quinolizine and pharmaceutically acceptable acid addition salts thereof.

3. A member selected from the group consisting of 2 - hydroxy - 2 - ethyl - 9 - chloro - 1,2,3,4,6,7 - hexahydro - 11bH - benzo[a]qinolizine and pharmaceutically acceptable acid addition salts thereof.

References Cited
UNITED STATES PATENTS

| | | | |
|---|---|---|---|
| 3,045,021 | 7/1962 | Brossi | 260—289 |
| 3,209,005 | 9/1965 | Brossi et al. | 260—289 |

NICHOLAS S. RIZZO, *Primary Examiner.*

D. G. DAUS, *Assistant Examiner.*